Patented Aug. 1, 1933

1,920,395

UNITED STATES PATENT OFFICE 1,920,395

PROCESS OF PRODUCING YEAST WITHOUT ALCOHOL

Ernst Jellinek, Vienna, Austria

No Drawing. Application October 15, 1930, Serial No. 488,994, and in Austria October 22, 1929

4 Claims. (Cl. 195—20)

This invention relates to a new process of producing yeast by the aeration process without alcohol. It is already known that the formation of alcohol can be wholly or partially suppressed by slow introduction or periodical addition of the sugary nutritive solution for instance of molasses, wood sugar, wort of cereals and so forth to the fermenting aerated yeast, or in other terms the alcohol generated by the splitting up of the sugar can be utilized wholly or partially as a source of carbon for the building up of cells.

In this process the yeast that is to be propagated is subjected to unfavourable conditions during the entire fermentation. According to the present invention the production of yeast is divided into two parts, whereby during the first part of fermentation a well fed yeast and a considerable quantity of alcohol are produced, while during the second part of fermentation the same yeast is forced to assimilate the alcohol which was formed. In view of the large quantity of seed yeast present during the second part of fermentation (the entire quantity of yeast of the first part is used), a single partition of cells is quite sufficient to obtain the desired yield. The yeast thus produced possesses all properties asked for of a good baker's yeast.

The present process is divided into two steps, the first step consisting in the production of an albumin-yeast with development of alcohol by the well known process which consists essentially in performing the propagation of the yeast with aeration in a fermenter or vat to which the nutritive solution, yeast nutrients and seed yeast for a complete operation are added at once or during a short lapse of time (Abstellverfahren) and the second step consisting in the consumption of the generated alcohol by the yeast during a subsequent "addition" process with considerable dilution and good aeration. With "addition" process I designate the process known in the art of yeast manufacturing with which the propagation of yeast in initiated in water or in a diluted portion of the nutrient solution while the remainder of the nutrient solution which has been prepared in a relatively concentrated state is slowly and substantially continuously added thereto. Between the above characterized two steps a separation of the first yeast from its alcoholic wort is carried out. This separation is effected by common separators or in any other convenient manner, for instance by separation at the flocculent state.

The separated yeast is immediately diluted with water in a fermentation vat and is aerated while the alcoholic wort is collected in a sterilized receptacle and cooled if necessary to about 10 degrees centrigrade and is allowed for 6 to 8 hours to slowly run into the yeast which is subjected to aeration. This running in of the alcoholic wort may be done in a continuous or in a periodical manner. The wort may be subjected to a disinfecting filtration before it is added to the yeast. However in most cases the said filtration may be dispensed with, because in case of clean work the sour alcoholic worts are not dangerously infected.

After the second fermentation is finished, the yeast is separated and pressed in a known manner.

The wort of the second fermentation is of course free of alcohol.

*First example*

100 kg molasses are clarified in a known manner by dilution and heating with or without the addition of acids or chemicals. The clarified diluted solution of molasses, to which may be added organic nitrogen-containing extracts or inorganic ammonium salts as well as soluble phosphorus compounds, necessary for the growth of the yeast, is diluted in a fermentation vat with water of approximately 24° C. to 1400 litres. To this wort are added either 10 kg pressed seed yeast or a preliminary ferment, produced from pure culture yeast in molasses-wort. During slight aeration the entire wort is fermented in approximately 6 hours and a yield between 35 and 40% of yeast besides approximately from 12 to 15% of alcohol is obtained, that is to say from 100 kg molasses are obtained 35 to 40 kg yeast and 12 to 15 litres alcohol. Separation is carried out after the fermentation but before the so-called maturing, that is a subsequent aeration of the fermented wort at a steady sacharometer-indication. 1400 litres of wort may be treated in hardly one hour in a common separator. The alcoholic liquid passes into a separate receptacle, which may be provided with a float or a water gauge in order that the quantity of liquid may be read off. The separated yeast is immediately deposited in a fermentation vat, already containing about 1200 litres of water of a temperature of 24° C., and is here well aerated. At the same time the addition of the alcoholic wort is begun with either periodically or continuously. This running-in of the said wort lasts about 6 to 8 hours and the very albuminous yeast, possessing large cells, that was produced during the first part of the process undergoes a change caused by the strong dilution and aeration and by the scant nutrition. The partition of the cells, which needs not take place oftener than one time only produces in the new yeast smaller cells and renders the same poor in albumin, but far more durable. The rising power is that of a good baker's yeast. The whole alcohol is assimilated and used for producing cells. Additions of nitrogen—or phosphorus compounds are not any more required during the second part of the process, because sufficient material of that sort is present in the separated wort of the first fermentation.

In case of single partition of the cells double the quantity of yeast is produced as compared with the first fermentation, that is 70 to 80 kg. Calculated on the primary material this means a yield of 70 to 80% yeast and no alcohol.

*Second example*

100 kg cereals, preferably consisting of maize, green malt and malt sprouts, are damped, saccharified, acidified and percolated in a known manner. Yeast is produced in the pure wort in a way similar to the molasses-fermentation described in the first example, hereafter separation is effected and the yeast is again propagated while the alcoholic wort is added periodically or continuously. The yield is the same as in the case of molasses.

*Third example*

Sulphite lye, containing about 2% of fermentable sugar, is worked into yeast without alcohol in a similar manner as in the first example after neutralization and if necessary after oxidation of the free sulphurous acid with hydrogen peroxide, potassium manganate or the like with or without addition of molasses or wood sugar solutions. Other sugary and amylaceous materials may also be added.

I claim:—

1. Process of producing yeast without alcohol which comprises the propagating of yeast in a sugary nutritive solution while bubbling air through the solution slowly, the said process consisting essentially in allowing the yeast to propagate, adding thereto the nutritive solution, yeast nutrients and seed yeast for a complete operation, separating the produced yeast from the alcoholic wort, diluting the separated yeast with water, subjecting the same to strong aeration and slowly effecting the propagating of the said yeast by continuously adding the separated alcoholic wort to the yeast while the latter is being aerated, whereby the alcohol of the alcoholic wort is consumed and utilized as a source of carbon for the production of cells.

2. Process of producing yeast without alcohol which comprises the propagating of yeast in a sugary nutritive solution while slight aeration of the same is effected, the said process consisting essentially in allowing the yeast to propagate, adding thereto the nutritive solution, yeast nutrients and seed yeast for a complete operation, separating the produced yeast from the alcoholic wort, subjecting the said alcoholic wort to a disinfecting filtration, diluting the separated yeast with water, subjecting the same to strong aeration and slowly effecting the propagating of the said yeast by adding the separated, filtered alcoholic wort to the yeast while the latter is being aerated, whereby the alcohol of the alcoholic wort is consumed and utilized as a source of carbon for the production of cells.

3. Process of producing yeast without alcohol which comprises the propagating of yeast in a sugary nutritive solution while bubbling air through the solution slowly, the said process consisting essentially in allowing the yeast to propagate, adding thereto the nutritive solution, yeast nutrients and seed yeast for a complete operation, separating the produced yeast from the alcoholic wort, diluting the separated yeast with water, subjecting the same to strong aeration and slowly effecting the propagating of the said yeast by continuously adding the separated alcoholic wort to the yeast while the latter is being aerated, whereby the alcohol of the alcoholic wort is being utilized as a source of carbon for the production of cells.

4. Process of producing yeast without alcohol which comprises the propagating of yeast in a sugary nutritive solution while bubbling air through the solution slowly, the said process consisting essentially in allowing the yeast to propagate, adding thereto the nutritive solution, yeast nutrients and seed yeast for a complete operation, separating the produced yeast from the alcoholic wort, subjecting the said alcoholic wort to a disinfecting filtration, diluting the separated yeast with water, subjecting the same to strong aeration and slowly effecting the propagating of the said yeast by continuously adding the separated, filtered alcoholic wort to the yeast while the latter is being aerated, whereby the alcohol of the alcoholic wort is utilized as a source of carbon for the production of cells.

ERNST JELLINEK.